United States Patent [19]

Polmanteer et al.

[11] Patent Number: 5,407,159
[45] Date of Patent: Apr. 18, 1995

[54] SPUTTER STOPPER

[76] Inventors: Warren A. Polmanteer, 842 S. Summit Dr., Holts Summit, Mo. 65043; Juanita Burkhart, 425 Tortoise View Cir., Satellite Beach, Fla. 32937

[21] Appl. No.: 199,603
[22] Filed: Feb. 22, 1994
[51] Int. Cl.⁶ .............................................. A47B 96/06
[52] U.S. Cl. ................................ 248/213.2; 248/231.8
[58] Field of Search ............... 248/231.8, 213.2, 316.7, 248/316.5; 24/457, 510, 570; 126/389

[56] References Cited

U.S. PATENT DOCUMENTS

| | | | |
|---|---|---|---|
| 807,840 | 12/1905 | Martin | 248/231.8 |
| 1,211,171 | 1/1917 | Kershner | 248/316.7 X |
| 1,305,777 | 6/1919 | Cunningham | 248/213.2 X |
| 1,540,394 | 6/1925 | Hall et al. | 248/231.8 X |
| 1,928,995 | 10/1933 | Biasi | 248/231.8 X |
| 2,713,469 | 7/1955 | Wright | 248/316.7 X |
| 3,021,581 | 2/1962 | Cook | 24/457 |
| 3,736,917 | 6/1973 | Stepanek | 126/389 |
| 4,632,347 | 12/1986 | Jurgich | 24/570 X |
| 4,646,717 | 3/1987 | Baggioli | 126/373 |
| 4,735,192 | 4/1988 | Demeyere | 126/389 |
| 4,741,325 | 5/1988 | Anota | 126/389 |
| 5,193,524 | 3/1993 | Loyd et al. | 126/389 |

*Primary Examiner*—J. Franklin Foss
*Attorney, Agent, or Firm*—Richard J. Grundstrom

[57] ABSTRACT

The sputter stopper basically consists of a formed strip of metal or other material. The formed strip has first and second ends with a center region. The formed strip is configured to fit over an edge of a pot or pan with the first end resting against an inside surface of the pot or pan. The second end rests against an outside surface of the pot or pan. The inside surface of the center region rests upon the top edge of the pot or pan. A lid placed on the pot or pan rests upon the outside surface of the center region of the formed strip to create a small opening between the pot or pan and the lid. This allows excess pressure to escape the pot or pan to prevent the contents from sputtering or boiling over the edge.

3 Claims, 2 Drawing Sheets

SPUTTER STOPPER

BACKGROUND OF THE INVENTION

The present invention relates to a sputter stopper and more particularly to an apparatus which fits between a lid and a pot or pan to prevent excessive pressure buildup which causes the contents to sputter over the pot or pan's edge onto the stove top surface.

Pots, pans and kettles come in many shapes and sizes and have been used as cooking utensils for generations. Lids are available with most post and pans. Lids are used to reduce cooking time by holding heat and cooking under a higher pressure. The higher pressure being caused by the heat build up, expansion of the contents and boiling. The lids generally rest snugly within a formed edge of the pot or pan. The lid design determines the amount of pressure buildup within the pot or pan.

Pressure cookers are used to cook at relatively high pressures. The lid is actually sealed to the pot by one of several means. The most common by interlocking notches and grooves. The notches fitting within the groove and the lid is twisted to lock it in place. The amount of pressure buildup is controlled by a weight member placed on an exhaust port in the center of the lid.

The typical lid only rests within the formed edge with the weight of the lid holding the lid down. The weight of the lid allows a pressure buildup within the pot or pan as the contents is heated. The pressure builds up to a point to where the lid is lifted sightly to allow the excess pressure to escape. The lid than falls back in place which allows the pressure to build up again. The process is repeated again and again during throughout the cooking time.

The pressure as it rises and falls causes the contents to expand and "boil" over the edge of the pot or pan. As the lid is lifted, a quantity of the contents can be ejected from the pot or pan. This sputtering of the contents creates a mess on the cooking surface. To overcome this problem, chefs often place the lid in a cockeyed position to create a space between the lid and the pot or pan. This space prevents a pressure build up from happening which in turn prevents the sputtering of the contents. It is also known that forks or spoons can be inserted between the lid and the edge of the pot to create a space.

One pot or pan with a lid known in the prior art addressed this problem an overflow section attached to the pot along the top edge. The overflow section captures any overflow or contents which "sputter" out. The contents could than be returned to the pot by lifting the lid. This works well but it required a specially designed pot. It could not be uniformly applied to all existing pots and pans.

Accordingly, it is an object of the present invention to provide a sputter stopper that is adapted for universal use with a majority of existing pots, pans and kettles. With the sputter stopper of this invention it has been found that it can be used on small slanted sided pans to large straight sided kettles.

Another object of the present invention is to provide a sputter stopper that is constructed to provide a small opening between the lid and the pot or pan which allows excessive pressure to escape as it is developed to prevent sputtering or boiling over of the contents.

A further object of the present invention is to provide a sputter stopper that is independent from the pot or pan to thereby substantially reduce the cost of providing a solution to the sputtering problem.

Still another object of the present invention is to provide a sputter stopper that may be inexpensively made such that it is affordable by the majority of households.

SUMMARY OF THE INVENTION

To accomplish the foregoing and other objects of this invention there is provided a sputter stopper and more particularly to an apparatus placed over the edge of a boiling kettle or pan, fitting between the lid and the kettle, to create a space to allow pressure to escape.

The sputter stopper is basically formed from a formed strip of metal or other material. The formed strip has first and second ends with a center region. The formed strip is configured to fit over an edge of a pot or pan with the first end resting against an inside surface of the pot or pan. The second end resting against an outside surface of the pot or pan. The inside surface of the center region rests upon the top edge of the pot or pan. A lid placed on the pot or pan rests upon the outside surface of the center region of the formed strip to create a small opening between the pot or pan and the lid. This allows excess pressure to escape the pot or pan to prevent the contents from sputtering or boiling over the edge.

The sputter stopper may also include notches or waves along the center region for proper positioning on the various sizes of pots and pans. The sputter stopper could also include a handle for ease of installation and removal.

The forementioned and other objects and features of the present invention will be better understood and appreciated from the following detailed description of the main embodiment thereof, selected for purposes of illustration and shown in the accompanying drawings.

DETAILED DESCRIPTION

Figure 1:
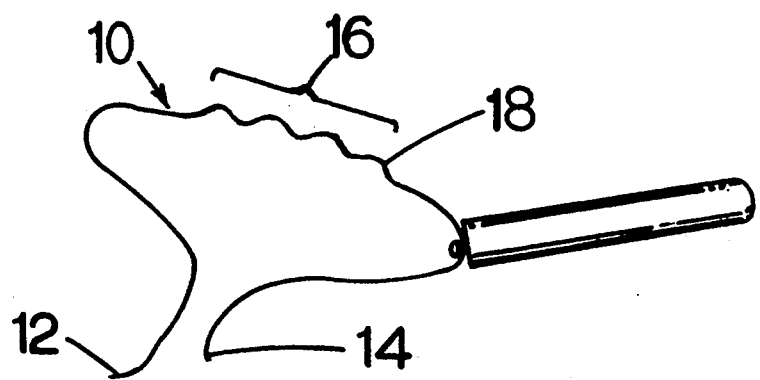
FIG. 1 is a side view of the sputter stopper of this invention.
Figure 2:
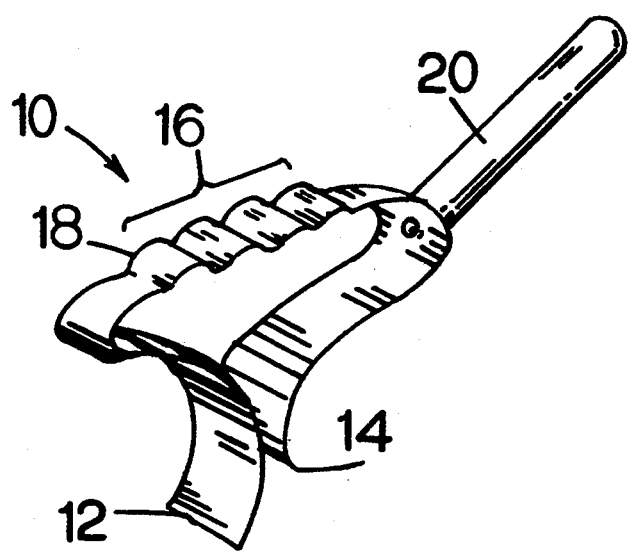
FIG. 2 is an isometric view of the sputter stopper.
Figure 3:
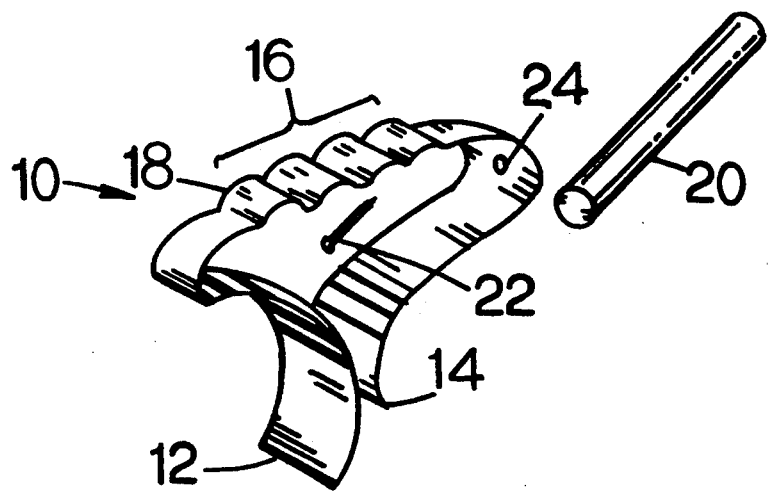
FIG. 3 is an exploded view of the sputter stopper.
Figure 4:
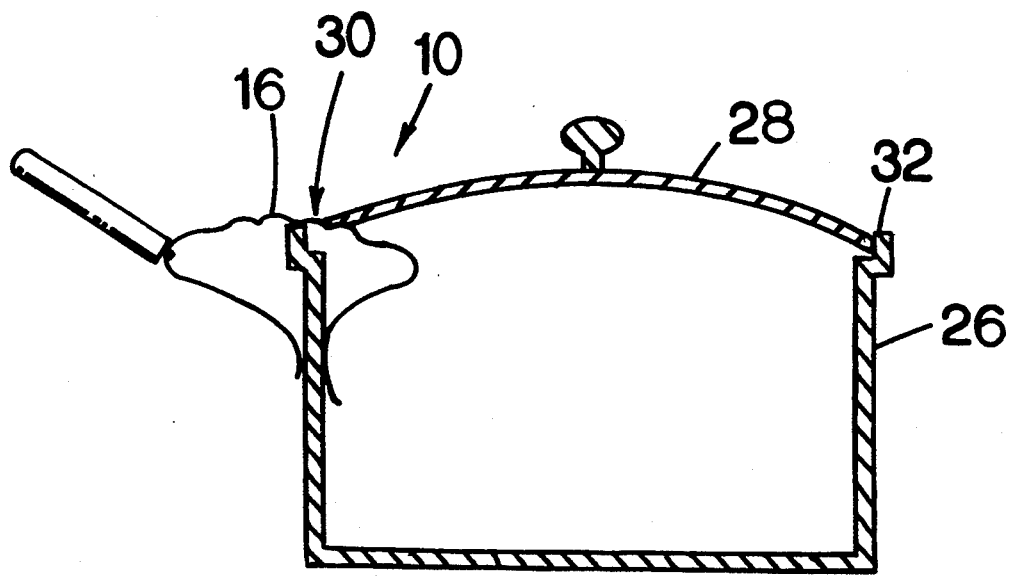
FIG. 4 is a sectional view of a typical pot with the sputter stopper showing the opening made between the lid and the pot's edge.

Referring now to the drawings in general there is shown the preferred embodiment of the sputter stopper 10 of this invention. Generally, the sputter stopper 10 is an apparatus placed over the edge 32 of a kettle, pot or pan 26, fitting between the lid 28 and the kettle, pot or pan 26. This creates a small opening 30 between the kettle, pot or pan 26 and the lid 28 which allows excess steam pressure to escape during boiling. This prevents excess buildup of pressure inside the kettle or pan 26 that causes the rise and fall of the lid 28. As the lid 28 rises and falls, without the sputter stopper 10, the steam pressure causes liquids to sputter over the edge of the kettle or pan 26 onto the cooking surface. This creates a mess.

The sputter stopper 10 is generally a metallic strip formed to fit over the edge 32 of a kettle, pot or pan 26. The center region 16 of the formed strip may contain waves or notches 18. The waves or notches 18 in the center region 16 of the sputter stopper 10 are to accommodate different sizes and shapes of kettles, pots and pans 26. This allows use of the sputter stopper 10 on small slanted sided pans to large straight sided kettles.

The preferred embodiment and the best mode contemplated of the sputter stopper 10 of the present invention are herein described. However, it should be understood that the best mode for carrying out the invention hereinafter described is offered by way of illustration and not by the way of limitation. It is intended that the scope of the invention include all modifications which incorporate its principal design features.

The formed strip is typically made of a strip of metal, i.e. stainless steel, steel and aluminum just to name a couple. Other metals and other material which could withstand the temperatures could also be used. The preferred embodiment, the sputter stopper 10 is constructed from stainless steel. The dimensions of the strip, in the preferred embodiment, prior to formation is approximately ½ inch wide by 6 inches long. However, other widths and lengths could also be used.

The formed strip has two ends labeled as a first end 12 and a second end 14. The region between the ends 12 and 14 is a center region 16. The formed strip is configured or bent to fit over an edge 32 of a pot or pan 26. When properly configured the first end 12 will rest against the inside surface of the pot or pan 26. The second end 14 would rest against the outside surface of the pot or pan 26. In this configuration the inside surface of the center region 16 would be resting on the edge 32 of the pot or pan 26. When the sputter stopper 10 is positioned on the edge 32 of a kettle, pot or pan 26, a lid 28 placed on the pot or pan 26 will rest upon the outside surface of the center region 16 of the formed strip. This will create a small opening 30 between the kettle, pot or pan 26 and the lid 28. The ends 12 and 14 may be slightly curled for ease of installation and for aesthetics.

Waves or notches 18 can be provided in the center region 16. The waves or notches 18 in the preferred embodiment are made by a plurality of bends in the center region 16 of the formed strip. The waves 18 in the center region 16 engage the edge 32 of the pot or pan 26. This engagement helps to secure the sputter stopper 10 in a proper position. The plurality of waves or notches 18 allows a single wave or a notch 18 along the center region 16 to engage the edge 32 of a pot or pan 26. Since there is a wide variety of sizes and shapes of pots and pans there has to be a variety of waves or notches 18. The waves 18 can be uniform or in a sine wave formation or in a non-symmetrical form. In the preferred embodiment, the waves 18 consist of a series of four uniform waves with approximately one quarter inch wavelength.

The sputter stopper 10 in the preferred embodiment may also have a handle 20. The handle 20 is attached to the formed strip between the second end 14 and the center region 16 such that when the lid 28 is placed on the pot or pan 26 the handle 20 extends outward. The handle 20 is typically made of a material which resists heat transfer. The handle 20 is used to install and remove the sputter stopper 10 from the pot or pan 26. Typically, the sputter stopper 10 would be removed while the pot or pan 26, as well as the contents, are hot. The handle 20 allows the sputter stopper 10 to be removed without burning the fingers of the chef.

The handle 20 in the preferred embodiment is made of wood, but any other heat transfer resistant material could be used. The means of attachment would of course be dependant on the particular type of material the handle 20 is constructed. A small nail 22 or brad is inserted through a small hole 24 in the formed strip to attach the wooden handle 20. Glue, epoxy or other heat resistant adhesive material can be used to secure the handle 20 and to prevent the handle from rotating.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A sputter stopper comprising:
a formed strip, said formed strip comprising first and second ends and a center region, said center region further comprising waves, said formed strip being configured to fit over an edge of a pot or pan with said first end resting against an inside surface of said pot or pan, said second end resting against an outside surface of said pot or pan, and an inside surface of said center region resting on an edge of said pot or pan, said waves in said center region engaging said edge of said pot or pan, such that a lid placed on said pot or pan rests upon an outside surface of said center region of said formed strip to create a small opening between said pot or pan and said lid.

2. A sputter stopper comprising:
a formed strip, said formed strip comprising first and second ends, a handle and a center region, said handle attached to said formed strip between said second end and said center region, said formed strip being configured to fit over an edge of a pot or pan with said first end resting against an inside surface of said pot or pan, said second end resting against an outside surface of said pot or pan, and an inside surface of said center region resting on an edge of said pot or pan, such that a lid placed on said pot or pan rests upon an outside surface of said center region of said formed strip to create a small opening between said pot or pan and said lid, and such that when said lid is placed on said pot or pan said handle extends outward.

3. A sputter stopper comprising:
a formed strip, said formed strip having first and second ends and a center region having waves, said formed strip being configured to fit over an edge of a pot or pan with said first end resting against an inside surface of said pot or pan, said second end resting against an outside surface of said pot or pan, and an inside surface of said center region resting on said edge of said pot or pan, said waves on said center region engaging said edge of said pot or pan, such that a lid placed on said pot or pan rests upon an outside surface of said center region of said formed strip to create a small opening between said pot or pan and said lid and a handle, said handle attached to said formed strip between said second end and said center region such that when said lid is placed on said pot or pan said handle extends outward.

* * * * *